United States Patent [11] 3,622,562

[72] Inventor Dohannes Muetgeert
 Delft, Netherlands
[21] Appl. No. 733,807
[22] Filed June 3, 1968
[45] Patented Nov. 23, 1971
[73] Assignee Vasco Industries Corp.
 New York, N.Y.
[32] Priority May 30, 1967
[33] Netherlands
[31] 6707457

[54] NOVEL CROSS-LINKED DERIVATIVES OF MACROMOLECULAR ANHYDRO-GLUCOSIDES
 33 Claims, No Drawings
[52] U.S. Cl. .................................................. 260/233.3 R,
 99/129 R, 99/136 R, 99/144 R, 117/139.5 C,
 260/209 D, 260/233.5 R
[51] Int. Cl. ..................................................... C08b 19/06
[50] Field of Search ......................................... 260/233.3,
 209 D, 233.5

[56] References Cited
 UNITED STATES PATENTS
 2,599,620  6/1952  Filbert .......................... 260/209
 2,989,518  6/1961  Novak .......................... 260/209
 3,238,193  3/1966  Tuschhoff et al. ............ 260/233.5
 3,345,358  10/1967  Inklaar ......................... 260/233.5
  OTHER REFERENCES
 The Condensed Chemical Dictionary, 5th ed., 1956, Reinhold Publ. Co. N.Y. pg. 473
 Whistler et al., Starch (Chemistry and Technology), Vol. I, 1965, pages 254 and 255

Primary Examiner—Donald E. Czaja
Assistant Examiner—M. I. Marquis
Attorneys—Albert C. Johnston, Robert E. Isner, Lewis H. Eslinger and Alvin Sinderbrand ABSTRACT: Starch products that absorb water in many times their volume to form gels having improved stability to electrolytes and provided by reacting finely divided starch with dichloroacetic acid or a salt thereof, or with both this reactant and mono-chloro-acetic acid or a salt thereof. The product contains anhydroglucose units cross-linked together by ether linkages of carboxyalkylene ether bridges.

NOVEL CROSS-LINKED DERIVATIVES OF MACROMOLECULAR ANHYDRO-GLUCOSIDES

Starch and related products, including the constituents of starch, are known to have a macromolecular structure composed completely or essentially of a large number of D-glucopyranose units which are mutually connected in the alpha configuration at the 1–4 positions. The chains may be straight, as in amylose, or branched as in amylopectin.

It is known that such starch and starchlike substances can be converted into carboxymethylethers by a treatment with sodium-monochloroacetate. Such conversion products, however, normally show a low viscosity in an aqueous dispersion as compared with carboxymethylcellulose and moreover become easily insoluble in water after drying at higher temperatures. Especially at lower substitution degrees (D.S.) the aqueous dispersions are very sensitive to electrolytes in the sense that in the presence of only small electrolyte quantities the swelling power decreases considerably. One of the most important applications is the use as a thickening agent for neutral and basic dyes.

According to a more recently developed method as disclosed in U.S. Pat. No. 3,345,358 the usefulness of alkali carboxymethyl starches and at the same time, if desired, their viscosity in aqueous solutions can be considerably increased by causing such carboxymethyl compounds to be cross-linked in an acid medium with the formation of ester bonds between the carboxymethyl chains. In this way products may be obtained which spontaneously gel when contacted with water and may have such a gelling power that in a 2 percent solution water is bound so tightly that one can turn the container upside-down without any water flowing out. By an appropriate choice of the reaction conditions one may influence the viscosity at will. The monochloroacetic acid reacts as a mono- and bifunctional agent which simplifies considerably the production of such gel-forming products.

The use of these partially cross-linked ether-esters is especially advantageous in a neutral medium but the ester-bonds evidently have only a limited stability.

It is an object of the invention to provide novel macromolecular compounds and to develop methods for preparing them from macromolecular substances composed of alpha-1,4-glucopyranose units, i.e., D-glucose, or anhydroglucose, units and their derivatives.

It is a further object of the invention to provide conversion products of macromolecular, alpha-1,4-gluco-pyranose units containing materials having special viscosity characteristics.

It is a still further object of the invention to cross-link alpha-1,4-glucopyranose units in such a way that water soluble or dispersible compounds are formed which are largely stable to changes in the concentration of the hydrogen ion in aqueous solution.

A special feature of the invention is to provide cross-linked high molecular substances which are highly resistant in aqueous solution to the influence of the addition of electrolytes such as inorganic or organic salts, hydroxides or acids.

Further objectives and the methods of preparing the novel substances according to the invention will appear from the following description.

According to the invention it was found that novel cross-linked derivatives of macromolecular substances, essentially composed of alpha-1,4-glucopyranose units, could be obtained by contacting these substances in the presence of water and an organic solvent with mono- as well as dihalogen fatty acid and separating the reaction product from the liquid phase. The reaction may be carried out at room temperature but also at a lower or higher temperature. The pressure may be one atmosphere but higher or lower pressures may be applied. The reaction time may vary to a large extent but is for practical purposes between one half and ninety six hours. Especially at lower temperatures and with less finely dispersed base materials longer reaction times are normally required and in such case even several days may be needed.

Preferably alpha-halogen fatty acids are used for this cross-linking.

By the choice of the quantity of dihalogen fatty acid, especially dichloroacetic acid or the sodium salt of it, in combination with the reaction conditions the extent of cross-linking can be controlled. The products so obtained are much better resistant to hydrolizing conditions and electrolytes in general, especially at pH 7 and higher. Increased stability, however, occurs in the whole pH-area from strongly acid to strongly alkaline. By varying the proportion between mono- and dihalogen fatty acid, reaction products having a predetermined specific swelling power may be obtained. One may start from any desired starch type such as corn, wheat, rice, potato, topinambour, tapioca, maranta or sago starch. Also waxy starches as obtained with certain corn types, which starches are practically free from amylose, give stable, viscous products which are readily dispersible in water and may form stable gels with it.

Amylose is also a very useful starting material giving rise, in the presence of certain organic liquids during the reaction, to very clear solutions of low viscosity which are applied in the textile as well as the reproduction industry.

Of great practical importance is the fact that the rate of solution is considerably greater than with cellulosic products of similar viscosity properties. The increase may be even a 50 to 100 fold.

In the following by way of example the use of sodium mono- and -dichloroacetate is described; other mono- and dihalogen fatty acids or their alkali salts are obviously also useful, such as for example mono- and dichloropropionic acid.

One may add the mono- and dichloroacetate as a mixture, but also separately one after the other. The time lag between the two additions may be varied and selected in accordance with the desired end products. Preferably one acidifies in such case the product obtained with the monochloro acetate in the presence of alkali first to a pH below 4, then neutralizes to a pH of about 7, separates and washes the product, and then carries out the treatment with dichloroacetate, again in the presence of alkali. One may, however, also continue the treatment with the monochloroacetate after a longer or shorter period with the dichloroacetate without intermediate acidifying and/or separation.

In most cases it is to be preferred to add directly the whole mixture and moreover it is desirable to add more monochloroacetate than dichloroacetate. One uses then the dichloroacetate in a quantity of 1–40 percent, preferably 10–20 percent by weight of the monochloroacetate. The acid may be added as such or in solution, either as the free acid or as the alkali salt. Preferably an aqueous solution is used as the monochloroacetate is rapidly decomposed in acetone and also rather fast in methanol.

By the addition of monochloro acetic acid the carboxymethylether of the macromolecule is formed which according to U.S. Pat. No. 3,345,358 forms ester linkages with other macromolecules. The cross-linking bridge in this case is

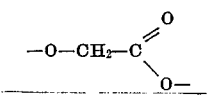

By adding also dichloroacetic acids cross-linking occurs in both sides by the more stable methylene ether linkages. The connecting bridge is in this case

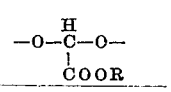

in which R may be hydrogen or, especially in alkaline medium, an alkali metal. By adding both halogenated acids both types of linkages are formed, of which the ester bond is easily hydrolizable.

The quantity of water is not critical and even relatively small quantities of water, normally already present in the base material, may be sufficient to bring about the cross-linking reaction.

One may also use all kind of organic solvent, although methanol, ethanol, dimethylformamide and dioxolane or their mixtures or mixtures with other solvents often have the advantage of a faster reaction rate and, being without substantial solvent action on the base material, of giving that advantage without producing a sticky end product or one that causes troubles with separating and purifying. Dioxolane and formamides give rise to very attractive, white end products.

A special application, tending to give especially low losses of solvent, is one in which so little liquid is added that the reaction mixture at most gets a crumbly, more or less pasty consistency. The reaction time, however, is often very long.

Reduction of the water quantity is especially important with a long reaction time as otherwise losses may occur through hydrolysis of the mono- or dichloroacetate. Moreover, in general, the separation of the end product is easier and solvent losses are lower with low water contents.

Temperature too has a large influence. At normal temperature (room temperature) reaction is very slow in most cases, but the products obtained are excellent. For normal applications of the end products a temperature of 50°–60° C. and a reaction time of some hours is very good. One obtains in this way reproducible end products of constant quality.

Instead of the above mentioned solvents one may also use liquids such as benzene, toluene and hexane, with which one obtains two liquid phases. This, however, is also the case with the use of acetone as the alkali dissolves very little in it. Good agitation is especially in such case a first requirement but it is also needed with a homogeneous liquid in order to obtain a constant end product. The advantage of two liquid phases is often based on the possibility of contacting the mono- and dihalogen fatty acids more gradually and in a better controlled way with starch, amylose, amylopectin or similar products.

The end product is obtained by an appropriate choice of the reaction mixture, with a homogeneous as well as a heterogeneous liquid phase, in the form of a suspension or slurry which can be filtered or centrifuged and from which the mother liquor has to be removed to avoid further conversions. This is done with advantage by washing or covering with water free methanol or ethanol. Other low boiling, water miscible, water free solvents are also usable. Preferably they should have a low boiling point as they have to be removed again by drying. Drying is done with advantage in thin layers, possibly under reduced pressure and with a dry or little humid air current flowing through or over the surface of the layers.

The properties of the end products may vary considerably and be adapted thereby to the final use. The degree of substitution is controllable between wide limits.

The swelling power can be predetermined to a certain value by selection of the reaction conditions. Technical applications are mainly based on the rheological behavior, the high solubility and the possibilities to apply the relevant products in the food area. Very valuable is herewith also the fact that the products, cross-linked according to the invention, are little pH-sensitive and show excellent gel forming properties also in an aqueous, electrolyte containing medium. One may prepare with it very stable mayonnaise, jellies, ice cream mixtures and the like. Application in the industry of solid combustible materials, such as fireworks, matches and explosive substances shows the advantage of a more even and less spattering combustion, probably by influencing the crystal formation. The product also has great advantages in the treatment of textiles, either as a thickening agent only or occur as an auxiliary in textile printing. Synerese phenomena do not occur or to an unimportant extent even at long storage of the gels. Wall paper can be adhered directly to silicate containing walls in a very simple way with the use of diluted dispersions of, for instance, amyloses which are cross-linked according to the invention. The D.S. of the two-sided ether linkings needs only to be very low and is in general between 0.01 and 0.04 to 0.05. Low D.S. do give a product with better swelling power in water. Products with a D.S. of 0.05, however, still can form a gel in aqueous medium without forming a residue, but to form a stiff gel one needs a higher concentration. Above a D.S. of 0.06 to 0.07 the products become of far less practical importance.

In the following some examples are given without limiting the invention thereto.

EXAMPLE 1

A standard mixture is prepared consisting of potato starch and 1.05 mol. sodium monochloroacetate to 162 grams of the starch (one glucose-unit). Per glucose-unit different quantities of dichloroacetic acid are added.

The composition of the reaction mixtures is given in the following table.

Reviewing the composition of the reaction mixtures used for the synthesis of the series of preparations J and N

| Preparation No. | J 64816 N 64920 | J 64815 N 64921 | J 64817 N 64922 | J 64818 N 64923 | J 64819 N 64924 |
|---|---|---|---|---|---|
| Component, name and particulars | Weight units | | | | |
| Acetone—technical quality | 1,000 | 1,000 | 1,000 | 1,000 | 1,000 |
| Potato starch—commercial quality "AVEBE supra," 18,0% | 100 | 100 | 100 | 100 | 1 00 |
| Sodium lye—NaOH-content 34,0 wt. percent | 81 | 89 | 96 | 105 | 120 |
| Sodium monochloroacetate—technical quality, content of active material abt. 80 wt. percent | 63 | 63 | 63 | 63 | 63 |
| Sodium dichloroacetate—technical quality, content of active material abt. 95 wt. percent | 5 | 10 | 15 | 20 | 30 |
| Water | 27 | 27 | 27 | 27 | 27 |

The results were as follows:

TABLE 2

Influence of the molecular proportion sodium dichloroacetate/starch on the solubility and the swelling power: Reaction—sodium monochloroacetate plus sodium dichloroacetate plus starch. Reaction time—120 minutes. Reaction temperature—55.0° C.

| Experiment, series and No. | Molecular proportion sodium dichloroacetate/starch. Mol sodium dichloroacetate/mol starch | Substitution degree (total), D.S. | Solubility, swelling power resp. of the derivative in water at 20° C. and concentration P, g./100 ml. | | |
|---|---|---|---|---|---|
| | | | Conc. (P), g./100 ml. | Solubility, percent | Swelling power, g. water/g. |
| J 64816 | 0.065 | 0.59 | 0.25 | 6.3 | 144 |
| J 64815 | 0.129 | 0.55 | 0.25 | 5.5 | 112 |
| J 64817 | 0.194 | 0.59 | 0.25 | 4.0 | 82 |
| J 64818 | 0.258 | 0.61 | 0.25 | 3.8 | 71 |
| J 64819 | 0.388 | 0.63 | 0.25 | 2.8 | 58 |
| N 64920 | 0.065 | 0.62 | 0.25 | 5.2 | 180 |
| N 64921 | 0.129 | 0.56 | 0.25 | | 117 |
| N 64922 | 0.194 | 0.56 | 0.25 | 4.2 | 97 |
| N 64923 | 0.258 | 0.61 | 0.25 | 3.4 | 75 |
| N 64924 | 0.388 | 0.63 | 0.25 | 2.2 | 55 |

The experiments were repeated without the addition of sodium monochloroacetate, but for the rest under identical conditions. Results were the following:

TABLE 3

Relation between the molecular proportion sodium dichloroacetate starch and the substitution degree: Reaction—sodium dichloroacetate and starch. Duration—120 min. Reaction temperature—55.0° C.

| Experiment, series and No. | Molecular proportion sodium dichloroacetate/ starch. Mol sodium dichloroacetate/ mol starch | Substitution degree, D.S. (ether) | Solubility, swelling power resp. of the derivative in water at 20° C. and concentration P, g./100 ml. | | |
|---|---|---|---|---|---|
| | | | Conc. (P), g./100 ml. | Solubility, percent | Swelling power, g. water/g. |
| K 64930 | 0.065 | 0.03 | 0.25 | 1.6 | 21 |
| K 64931 | 0.129 | 0.04 | 0.25 | 3.2 | 25 |
| K 64932 | 0.194 | 0.05 | 0.25 | 0.8 | 17 |
| K 64933 | 0.258 | 0.07 | 0.25 | 1.6 | 16 |
| K 64934 | 0.388 | 0.09 | 0.25 | 1.3 | 20 |

The difference in D.S. between table 2 and table 3 gives an indication of the substitution degree caused by the sodium monochloroacetate.

As is clear the N-experimental series is a duplicate of the J-experimental series.

The swelling power was determined by adding to 20 ml. water 0.030, 0.050, 0.080 and 0.150 grams of the dry end product respectively, agitating the whole with a microspatula and, after 2 hours agitating, centrifuging the obtained gels during 10 minutes in a centrifuge in a gravitation field of 3,200 g. The liquid layers so obtained were decanted from the gel residue and weighed. The difference with the original quantity of water gives the weight of water retained by the product. In a graph the retained quantities of liquid were drawn with respect to the weight of the swelling agent and extrapolated to a zero concentration. From this a relative swelling power was obtained which was independent from the concentration. All determinations were made at the same pH of the liquid (pH=7).

The preparations appeared to give viscosity stable aqueous solutions even at a pH above 14.

The color was somewhat yellowish, probably due to a side reaction between acetone and dichloroacetic acid. With dioxolane

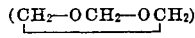

$$(CH_2-OCH_2-OCH_2)$$

as a solvent instead of acetone clear white end products were obtained.

The end products were separated by filtration from the reaction mixture after acidifying with HCl to pH=1.1, washed with 80 percent-aqueous methanol, then suspended in 80 percent methanol, brought at pH 5–6 with 34 percent-sodium hydroxide and filtered again. The product remaining in this way on the filter was washed with 100 percent pure methanol and dried at 80° C. The yield was always around about 85 percent of the theoretical yield.

EXAMPLE 2

One hundred g. of starch (moisture 18 percent) was suspended in 200 ml. methanol to which 60 g. of a 33 percent KOH-solution was added. To this mixture a mixture of 42.5 g. monochloroacetate and 7.5 g. of dichloroacetate was added. The reaction was continued for 2 hours at 55° C. while agitating.

The substitution degree of the end product processed according to example 1 was 0.65 of which 0.05 was by cross-linking. When substituting acetone for methanol the quantity of KOH had to be cut in half and 18 g. monochloroacetate with 2 g. dichloroacetate had to be added to obtain the same D.S. and the same swelling power under, for the rest, the same conditions.

From this the large influence of the solvent on the reaction speed is clear.

On replacing the methanol by 150 ml. acetone and adding 42.5 g. monochloroacetate and 7.5 g. dichloroacetate the end product appeared to have a D.S. of 0.85.

EXAMPLE 3

The experiment of example 2 with 200 ml. methanol as a solvent was repeated with the difference that the methanol was replaced by the same volume of the cyclic diacetal from diethylene glycol and formaldehyde. The end product had a clear white color and nearly the same D.S. as the product obtained with 200 ml. methanol.

EXAMPLE 4

Variation of the quantity of dichloroacetate: 50 g. of starch, 100 ml. methanol and 30 g. of 33 percent NaOh solution were agitated at 55° C. during ¼ hour. Then 25 g. of a mixture of mono- and dichloroacetate was added in which the quantity of dichloroacetate (DCA) calculated on monochloroacetate (MCA) (both as Na-salt) were systematically varied.

The product was processed by filtration after the reaction, adding 150 ml. 80 percent methanol, agitating 15 minutes and filtering again. After that 120 ml. 100 percent methanol was added and 15 ml. water and 25 percent-hydrochloric acid solution until the pH became 7. Agitation was continued during 30 minutes and continually hydrochloric acid solution was added to keep pH=7. Then again filtration, adding 50 ml. 100 percent methanol, filtering again and drying at 80° C.

Results were as follows:

| % DCA calculated on MCA | Properties end product in 2% aqueous solution |
|---|---|
| 1 | viscous solution |
| 5 | more viscous solution |
| 10 | stiff viscous solution |
| 15 | gel formation |
| 20 | somewhat stiffer gel |
| 30 | gel about as stiff as with 20% DCA |
| 50 | thin settling dispersion |
| 100 | insoluble in water. |

Cross-linking here increases more and more to make the product more and more insoluble at about 30 percent under these reaction conditions.

EXAMPLE 5

Variation of reaction time.

Starting composition:  100 g. starch (18% moisture)

200 ml. methanol
60 g. 33%-NaOH-solution
42.5 g. MCA
7.5 g. DCA (Na-salt).

Treatment and processing as in example 4 but with varying the reaction time.

Result was as follows:

| Nr. | Reaction time in hours | Properties of product in 2%-aqueous solution |
|---|---|---|
| 1 | 1 | gel formation |
| 2 | 1½ | somewhat stiffer gel |
| 3 | 2 | same gel as in Nr. 2 |
| 4 | 2½ | same gel as in Nr. 2 |
| 5 | 5 | somewhat stiffer gel. |

EXAMPLE 6

Pre- and aftertreatment with hydrochloric acid solution:

Fifty g. starch (from corn) was agitated during 1 hour with 400 ml. 90 percent-methanol and 35 ml. 25 percent-hydrochloric acid solution, after which the whole was filtered.

Then 100 ml. 80 percent-methanol was added and neutralized with sodium hydroxide solution (33 percent) in 5 minutes. After filtration the product was carboxymethylated with 15 percent DCA calculated on MCA.

In 2 percent aqueous solution the product swells only after agitating. It is somewhat less stiff than a similar product not pretreated with hydrochloric acid solution, probably because the hydrochloric acid in the interior of the starch particle was not fully neutralized and so one worked with a lower hydroxide concentration.

The same product was prepared under identical conditions except that the end product was treated with hydrochloric acid solution (25 percent) and then neutralized.

The end product swells spontaneously in water with formation of a 2 percent-gel. The formed gel is, however, thinner than without acidifying with hydrochloric acid. On adding alkali-hydroxide solution to pH=8 and higher the more or less crumbly gel changes into a stiff gel.

Spontaneous swelling is inherent to cross-linking by ester formation of the MCA. On aftertreatment with hydrochloric acid this ester formation goes too far but goes back again when adding alkali.

In this way the behavior of the end product can still be influenced.

EXAMPLE 7

Variation of solvent:

The experiments of example 4 are repeated but now with a reaction mixture consisting of:

25 g. starch
50 ml. acetone
7.5 g. 33 percent-NaOH
5 g. MCA +DCA.
Treatment as in example 4.
Results were as follows:

| % DCA calculated on MCA | Properties of final product in 2% aqueous solution |
|---|---|
| 0 | viscous solution |
| 5 | shorter, stiffer solution |
| 10 | gel as with 15% DCA in example 4 |
| 15 | thin gel |
| 20 | thin, settling gel, product is yellow |
| 30 | same |
| 50 | same |
| 100 | same. |

On changing the reaction time from ½ to 5 hours at 55° C. here, as well as in example 4, after 2 hours the optimum was reached, when starting from a mixture in which DCA amounted to 10 percent of MCA weight.

Replacement of the starch with starch from tapioca, rye, rice and soya had little influence on the final product with the mixture containing 10 percent DCA based on MCA weight.

The product obtained with potato starch, that had reacted 2 hours at 55° C. and was processed in the way described in example 4, appeared to be an excellent means to paste wall paper on a wall that had been spread with cement. The wall had a surface of 4×8 meter and the solution was spread on it as well as on the wall paper. Processing was very simple and the adhesive fluid did not form clots and spread evenly over the treated surfaces. After one year the appearance of the wall paper was still in excellent condition without any defect.

EXAMPLE 8

Properties of the product obtained according to example 2 with 200 ml. methanol:

The end product of example 2 was added to 100 ml. NaCl solution of different concentrations in such quantity that a gel was obtained of the same stiffness as with 2 percent of the product in water without salt addition. Stiffness was evaluated visually.

Results were as follows:

TABLE 4 - Influence of salts on the stiffness of the cross-linked starch.

| Nr. | Number of g. NaCl on 100 g. water | g. end product needed to produce the same stiffness as with unsalted water | % NaCl calculated on the quantity of end product |
|---|---|---|---|
| 1 | 0 | 2.0 | 0 |
| 2 | 0.1 | 2.8 | 3.5 |
| 3 | 0.5 | 4.3 | 11.6 |
| 4 | 1.0 | 5.0 | 20 |
| 5 | 2.0 | 6.0 | 33 |
| 6 | 4.0 | 6.4 | 63 |
| 7 | 10.0 | 7.0 | 143 |
| 8 | 20.0 | 7.0 | 186 |
| 9 | 30.0 | 7.0 | 230 |

On increasing the concentration of the end product in all cases the stiffness of the gel increases too. By adding alkali hydroxide to the gel the gel structure is maintained, even at pH=14. In the latter case the gel becomes somewhat thinner through the influence of the electrolyte.

EXAMPLE 9

A mixture of 100 g. starch (18 percent humidity), 200 ml. methanol, 60 g. 33 percent NaOH and 66 g. of a mixture of 15 percent DCA and 85 percent MCA was treated in the way described in example 4, but at different temperatures.

The result was as follows:

| Temp. | Reaction time needed to obtain a final product that forms in 2%-solution a stiff gel that can be turned upside down without losing water. |
|---|---|
| 37° C. | 72 hours |
| 45° C. | 2 hours |
| 55° C. | 1 hour |

With larger quantities of DCA + MCA shorter reaction times are obtained. Also on replacing methanol by the same volume of acetone the reaction time is shorter.

EXAMPLE 10

Cross-linking of amylose in the "crumbly" condition:

The mixture consisted of: 25 g. amylose, 48 g. acetone, 20 g. 40 percent-NaOH solution, 20 g. of a mixture of 15 percent DCA and 85 percent MCA.

In a closed vessel this mixture was put aside during 96 hours at 20° C. The end product, processed as described in example 4, appeared to have a D.S. of 0.61 with a D.S. from ether-cross-linking of 0.04.

Unsubstituted amylose was absent. With amylopectin under the same conditions and with the same composition a D.S. of 0.43 was obtained with an ether-D.S. of 0.02. Both products were in 2 percent aqueous solution much less viscous than the products obtained under the same conditions from starch.

I claim:

1. A method of preparing a gel forming derivative of a substance composed predominantly of macromolecules of anhydroglucose units, selected from the group consisting of starches, amylose and amylopectin, which comprises reacting said substance with a dichloroacetic or dichloro-propionic acid or an alkali metal salt thereof until said macromolecules in substantial part are cross-linked together by carboxyalkylene ether bridges each of which has two ether linkages bound to respective nucleii of said macromolecules and both bound directly to the alkylene nucleus of the bridge.

2. A method according to claim 1, said fatty acid being dichloroacetic acid, whereby said cross-linking bridges are

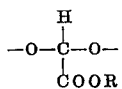

groups in which R is hydrogen or an alkali metal.

3. A method according to claim 1, said reaction being effected by contacting said substance in finely divided state with said fatty acid or salt thereof in an alkaline liquid medium containing water, alkali and a liquid organic solvent, and separating the solid reaction product from the liquid phase.

4. A method according to claim 3, said solvent being selected from the group consisting of methanol, ethanol, acetone, methyl ethyl ketone, dioxolanes, formamides, and mixtures thereof.

5. A method according to claim 3, said solvent being only partly miscible with other components of the reaction mixture and said contacting being effected by regulated agitation of said mixture.

6. A method according to claim 5 said solvent being selected from the group consisting of acetone, benzene, toluene and hexane.

7. A method according to claim 1, which comprises reacting said substance not only with said dichloro- reactant as aforesaid but also with a monochloro-acetic or dichloro-propionic acid or an alkali metal salt thereof until said macromolecules in substantial part are converted by the monochloro- reactant into the corresponding carboxyalkyl ether.

8. A method according to claim 7, comprising reacting said substance first with the monochloro- reactant, then separating the solid material from the reaction medium, and thereafter reacting it with the dichloro- reactant.

9. A method according to claim 7, and after the last-mentioned reaction further reacting the material in the presence of mineral acid at a pH below 4 until macromolecules of said ether in substantial part are cross-linked through carboxy groups on their alkyl ether groups to other macromolecules in the material.

10. A method according to claim 7, wherein after the reactions with said monochloro- and dichloro- reactants the solid product is separated from the reaction liquid and then is further reacted in the presence of mineral acid at a pH below 4 until macromolecules of said ether in substantial part are cross-linked through carboxy groups on their alkyl ether groups to other macromolecules in the material.

11. A method according to claim 7, comprising reacting said substance first with the monochloro- reactant, then acidifying the material and further reacting it in the presence of mineral acid at a pH below 4 until macromolecules of said ether in substantial part are cross-linked through carboxy groups on their alkyl ether groups to other macromolecules in the material, then separating the material from the reaction medium, neutralizing it with alkali, and reacting it with the dichloro- reactant for the cross-linking by said carboxyalkylene ether bridges.

12. A method according to claim 7, comprising reacting said substance first with the dichloro- reactant in an alkaline liquid medium, then adding the monochloro- reactant to the reaction mixture and reacting it with said substance therein, and then acidifying the mixture and further reacting the material therein in the presence of mineral acid at a pH below 4 until macromolecules of said ether in substantial part are cross-linked through carboxy groups on their alkyl ether groups to other macromolecules in the material.

13. A method according to claim 7, comprising reacting said substance in an alkaline liquid medium with both the dichloro- reactant and the monochloro- reactant and then acidifying the reaction mixture and further reacting the material therein in the presence of mineral acid at a pH below 4 until macromolecules of said ether in substantial part are cross-linked through carboxy groups on their alkyl ether groups to other macromolecules in the material.

14. A method of preparing a gel forming derivative of a substance composed predominantly of macromolecules of anhydroglucose units, selected from the group consisting of starches, amylose and amylopectin, which comprises reacting said substance with dichloroacetic acid or an alkali metal salt thereof and also with monochloroacetic acid or an alkali metal salt thereof by contacting said substance in finely divided state with said acetic reactants in an alkaline liquid medium containing alkali, water and a liquid organic solvent, and separating the solid reaction product from the liquid phase.

15. A method according to claim 14, said substance being contacted and reacted with the monochloroacetic reactant in larger quantity than with the dichloroacetic reactant.

16. A method according to claim 14, the quantity of the dichloroacetic reactant being about 10 to 20 percent, by weight, of that of the monochloroacetic reactant.

17. A method according to claim 14, wherein at the outset the mono- and dichloroacetic reactants are mixed with said substance and said solvent.

18. A method according to claim 14, wherein at the outset an aqueous alkali hydroxide solution and the mono- and dichloroacetic reactants are mixed with said substance and said solvent.

19. A method according to claim 14, wherein at the outset an aqueous alkali hydroxide solution and the monochloroacetic reactant are mixed with said substance and said solvent, and after 1 to 24 hours of reaction the dichloroacetic reactant is added and reacted in the reaction mixture.

20. A method according to claim 14, said solvent being acetone.

21. A method according to claim 14, said solvent being methanol.

22. A method according to claim 14, said solvent being a dioxolane.

23. A method according to claim 14, the amount of said solvent present in the reaction mixture being by weight about 50 to 150 percent of the combined weights of said substance and said acetic reactants therein.

24. A method according to claim 14, said solvent and water being present in the reaction mixture in such small amounts that said mixture maintains a crumbly consistency during the course of the reactions.

25. A method according to claim 14, wherein the reaction mixture contains, by weight, about 20 to 30 percent starch, 30 to 50 percent of said solvent, 3 to 10 percent alkali hydroxide, 10 to 15 percent sodium monochloroacetate, 2 to 3 percent sodium dichloroacetate and 7 to 15 percent water.

26. A method according to claim 14, said contacting being carried on during about 1 to 3 hours at a temperature of about 50° to 60° C.

27. A method according to claim 14, and thereafter washing said reaction product with a water miscible organic solvent.

28. A method according to claim 14, and thereafter treating said reaction product with an aqueous mineral acid solution at a pH below 4 in a water miscible organic solvent, separating the acidified material from the acid liquid medium, then neutralizing the material with alkali hydroxide solution in a water miscible organic solvent, washing it with such solvent and drying it.

29. A gel forming derivative of a substance composed predominantly of macromolecules of anhydroglucose units, selected from the group consisting of starches, amylose and amylopectin, wherein such macromolecules in substantial part are linked together by carboxy-alkylene ether bridges having one or two carbon atoms in the alkylene nucleus, each of which bridges has two ether linkages bound to respective units of such macromolecules and both bound directly to the alkylene nucleus of the bridge.

30. A gel forming derivative according to claim 29, said bridges being methylene ether bridges having the structure

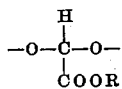

in which R is hydrogen or an alkali metal.

31. A gel forming derivative according to claim 30, wherein the content of said methylene ether bridges corresponds to a degree of substitution thereof, in place of hydroxyl groups of said macromolecules, amounting to between about 0.01 and 0.07.

32. A gel forming derivative according to claim 30, wherein such macromolecules in substantial part also are linked together by carboxymethyl ether bridges each of which is bound to respective units of such macromolecules through its carboxy group and through an ether linkage bound directly to its methyl nucleus.

33. A gel forming derivative according to claim 32, wherein the contents of said methylene ether bridges and said carboxymethyl ether bridges correspond to degrees of substitution thereof, in place of hydroxyl group of said macromolecules, amounting to between about 0.01 and 0.07 for the methylene ether bridges and to between about 0.43 and 0.85 for the bridges of both types.

* * * * *

UNITED STATES PATENT OFFICE
CERTIFICATE OF CORRECTION

Patent No. 3,622,562                        Dated November 23, 1971

Johannes Muetgeert

Assignor to Vasco Industries Corp., a New York corporation.

It is certified that error appears in the above identified patent and that said Letters Patent are hereby corrected as shown below:

On the first page of the patent, at item [72] Inventor, in place of "Dohannes" read -- Johannes -- .

In the Abstract, line 3, in place of "and" read "are".

Column 2, line 5, in place of "resistent" read "resistant".

Column 7, line 64, in place of "1/ " read "1/2".

Column 8, line 25, in place of "3.5" read "3.".

Column 9, lines 38-39 [claim 7, lines 3-4], in place of "dichloro-propionic" read "-propionic".

Signed and sealed this 13th day of June 1972.

(SEAL)
Attest:

EDWARD M. FLETCHER, JR.            ROBERT GOTTSCHALK
Attesting Officer                   Commissioner of Patents